(12) United States Patent
Zauner (10) Patent No.: US 7,367,295 B2
(45) Date of Patent: May 6, 2008

(54) EXHAUST CONTROL VALVE FOR INTERNAL COMBUSTION ENGINE

(75) Inventor: Helmut Zauner, Krenglbach (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 648 days.

(21) Appl. No.: 10/976,814

(22) Filed: Nov. 1, 2004

(65) Prior Publication Data

US 2007/0186882 A1 Aug. 16, 2007

Related U.S. Application Data

(60) Provisional application No. 60/515,694, filed on Oct. 31, 2003.

(51) Int. Cl.
*F02B 75/02* (2006.01)
(52) U.S. Cl. .............................. 123/65 PE; 123/90.11; 123/65 P
(58) Field of Classification Search ............ 123/65 PE, 123/65 P, 90.11, 90.22, 90.23, 90.4
See application file for complete search history.

(56) References Cited

U.S. PATENT DOCUMENTS

| | | | |
|---|---|---|---|
| 4,998,512 A | 3/1991 | Masuda et al. | |
| 5,000,131 A | 3/1991 | Masuda | |
| 5,063,887 A | 11/1991 | Ozawa et al. | |
| 5,063,888 A | 11/1991 | Ozawa et al. | |
| 5,220,890 A | 6/1993 | Koriyma | |
| 5,373,816 A | 12/1994 | Asai et al. | |
| 5,537,958 A | 7/1996 | Nishimura et al. | |
| 5,598,813 A | 2/1997 | Masuda et al. | |
| 5,605,119 A | 2/1997 | Masuda et al. | |
| 5,873,334 A | 2/1999 | Heinrich | |
| 6,510,913 B1* | 1/2003 | Morin et al. ................ | 180/182 |

FOREIGN PATENT DOCUMENTS

| | | |
|---|---|---|
| AT | 407555 B | 4/2001 |
| DE | 2927521 | 1/1981 |
| JP | 05133230 A2 | 5/1993 |
| JP | 07279675 | 10/1995 |
| JP | 07279675 A2 | 10/1995 |
| JP | 10153272 | 6/1998 |
| JP | 11132045 | 5/1999 |

\* cited by examiner

*Primary Examiner*—Stephen K. Cronin
*Assistant Examiner*—Katrina B. Harris
(74) *Attorney, Agent, or Firm*—Osler, Hoskin & Harcourt LLP (57) ABSTRACT

An exhaust valve assembly for a two stroke internal combustion engine having a cylinder with at least one main exhaust port and one auxiliary exhaust port is disclosed. The assembly comprises a main exhaust valve for at least partially closing the main exhaust port, an auxiliary exhaust valve for at least partially closing the auxiliary exhaust port, an actuator for actuating the main exhaust valve and the auxiliary exhaust valve, the actuator including a rotary shaft having a first gear and a second gear, the rotary shaft being operatively connected to the main exhaust valve via the first gear, the rotary shaft being operatively connected to the auxiliary exhaust valve via the second gear, an electric motor operatively connected to the rotary shaft for rotating the rotary shaft.

22 Claims, 6 Drawing Sheets

EXHAUST CONTROL VALVE FOR INTERNAL COMBUSTION ENGINE

The present invention claims priority to U.S. Provisional Application Ser. No. 60/515,694, which was filed on Oct. 31, 2003, the entirety of which is hereby incorporated into the present application by reference.

BACKGROUND OF THE INVENTION

1. Field of the Invention

The present invention relates to a exhaust control valve assembly of a two stroke internal combustion engine. More particularly, the invention relates to a technically efficient exhaust control assembly wherein both the main exhaust control valve and the at least one auxiliary exhaust control valve can be controlled by only one actuator.

2. Discussion of the Related Art

As is generally known two-stroke (often referred also as two-cycle) engines generally have exhaust and intake ports in the side walls of a cylindrical chamber. The cylindrical chamber and its side walls are usually referred to simply as a cylinder. While the intake ports feed air into the cylinder, the exhaust ports guide burned gas out of the cylinder into the exhaust of the engine. Since the intake and exhaust ports are at a fixed positions on the cylinder wall, the intake and exhaust ports are opened and closed by the piston which reciprocally moves up and down in the cylinder. Ideally however, for optimal operation of the engine, the position of the intake and the exhaust ports would be alterable according to the status of operation of the engine, preferably depending on engine speed and load. It follows from this consideration that the position of the exhaust ports is a compromise which allows for a proper performance of the engine both in low and high engine speed ranges.

It is known that by altering the vertical position of the upper edge of the exhaust port on the cylinder wall so that at high engine speeds the exhaust can be kept open longer, will considerably improve engine performance.

In this respect, it is known for example from AT 380 537 B that a main exhaust slide valve can be fitted in the exhaust passage proximate to the cylinder head. This main exhaust slide valve will be supported in a guide opening that is generally radial relative to the cylinder. At its free face end the slide valve forms a control edge that conforms to the cylinder bore, so that when the control valve is in its advanced position, the exhaust outlet cross-section is partially covered in its vertical dimension. This results in a corresponding reduction of the exhaust period because of the delayed opening and earlier closing of the exhaust passage. Thus, the charging of the cylinder in the middle and lower speed ranges is improved.

In some cases, in order to improve the exhaust conditions at the beginning and at the end of the exhaust gas discharge, auxiliary lateral exhaust outlets, connected through lateral channels to the main exhaust passage, are provided in the cylinder. These auxiliary exhaust outlets may be closed in order to reduce the exhaust period. Typically this is accomplished by cylindrical shutoff valves. These shutoff valves can through the lateral channels and can rotate or slide between a closed position and an open position. They are mechanically connected to the main exhaust valve such that they are actuated thereby.

One disadvantage of this known exhaust period control system is its technically complex design. Locating rotatable cylindrical shutoff valves in the lateral channels (which must be supported so as to be rotatable), and actuating them via the main exhaust valve (whose pivot axis is offset by 90° relative to the axes of rotation of the shutoff valves) is considerable. Another is the simple fact that the auxiliary (cylindrical shutoff) valves must be driven by the main exhaust valve. It would be desirable to have them be separately driven to allow them to be opened at different speeds.

EP 0 141 650 A2 describes a lateral auxiliary exhaust outlet which is controlled by means of a shutoff slide valve. The valve is actuated as a function of engine speed, with it only opening at higher speeds. However, this design incorporates no main exhaust valve at all.

JP 7279675 A describes an engine having both a main exhaust port with a main exhaust valve and an auxiliary exhaust port with an auxiliary exhaust valve. Both valves are actuated by a single motor; the main exhaust via a lever system, the auxiliary exhaust valves via a complicated gear system. This system is expensive and takes up a great deal of space.

Thus there is a need in the art for an improved exhaust system for a two-stroke internal combustion engine.

SUMMARY OF THE INVENTION

An aspect of embodiments of the invention provides an exhaust control valve assembly for an two-stroke internal combustion engine which is characterised by a technically efficient actuation of the main and the auxiliary exhaust valves.

Other aspects of embodiments of the invention allow a relatively small installation space, a simple mounting arrangement and a reliable operation of the exhaust control valve assembly.

Other aspects of embodiments of the invention allow a relatively small installation space, a simple mounting arrangement and a reliable operation of a 2-stroke internal combustion engine.

Other aspects of embodiments of the invention allow designing a snowmobile, the snowmobile having a very compact and powerful high-performance 2-stroke internal combustion engine as provided by the present invention.

One aspect of the invention is directed to an internal combustion engine having a crankcase, a crankshaft disposed within the crankcase, a cylinder block connected to the crankcase, the cylinder block having a cylinder disposed therein. The internal combustion engine further having a main exhaust port in fluid communication with the cylinder, an auxiliary exhaust port in fluid communication with the cylinder, a piston movably disposed within the cylinder and being operatively connected to the crankshaft and an exhaust valve assembly. The exhaust valve assembly of the internal combustion engine comprising a main exhaust valve for at least partially closing the main exhaust port, an auxiliary exhaust valve for at least partially closing the auxiliary exhaust port and an actuator for actuating the main exhaust valve and the auxiliary exhaust valve. The actuator including a rotary shaft having a first gear and a second gear, the rotary shaft being operatively connected to the main exhaust valve via the first gear, the rotary shaft being operatively connected to the auxiliary exhaust valve via the second gear, an electric motor operatively connected to the rotary shaft for rotating the rotary shaft. Said internal combustion operating on a two-stroke principle.

By the present invention both of the main exhaust and the at least one auxiliary exhaust valve can be controlled by one single actuator. According to a preferred embodiment the actuator comprises a rotatable shaft on which a number of gears or gear segments are disposed. By this arrangement a direct response of the exhaust valves on the actuation, for instance by a servomotor, can be ensured. Compared to prior art which teaches the use of levers or pneumatic devices the inventive arrangement provides the most direct response of the exhaust control valves to their actuation. Furthermore by using, for instance a steppermotor to rotate the rotatable shaft, it is possible to provide an unlimited number of positions of the exhaust valves. This is clearly an advantage over the pneumatic devices taught by the prior art, as those can only provide a retracted and an extended position of the control valves. As should be appreciated by those skilled in the art, the invention is particularly useful for high performance engines, such as those used on motorcycles, snowmobiles, personal watercrafts or other vehicles of the recreational business.

By actuating the main and the auxiliary exhaust valves by gears or gear segments the man skilled in the art can overcome all prior solutions dealing with complicated levers and pneumatic actuation of the exhaust control valves. Having the gears for the main and the auxiliary exhaust control valve arranged on a single rotatable shaft per cylinder, it is possible to control the position of the main exhaust control valve and the auxiliary exhaust control valve at the same time by simply rotating the shaft, by an appropriate servo motor or another device capable of rotating the shaft, preferably according to the demand of an engine control unit.

According to a preferred embodiment of the present invention the main exhaust port and the auxiliary exhaust port are disposed laterally on the cylinder, as is common on most two-cycle internal combustion engines.

According to a preferred embodiment of the present invention the main exhaust valve is directly connected with the first gear and wherein the auxiliary valve is directly connected with the second gear. With this embodiment a very reliable and compact design can be accomplished.

According to another aspect of the invention the main exhaust valve and the at least one auxiliary exhaust valve each comprise a toothed rack, wherein the toothed rack of the main exhaust valve meshes with the teeth of the first gear and wherein the toothed rack of the at least one auxiliary exhaust valve meshes with the teeth of the second gear.

By the combination of the gears mounted on the rotary shaft and the toothed racks of the main exhaust valve and the at least on auxiliary exhaust valve a reliable and efficient connection can be established. Compared to solutions known from the prior art which teach the use of levers or linkages using either wires or cables for connecting the exhaust valves to the rotatable shaft, the proposed connection is more reliable and minimises the need of readjustment.

According to a further aspect of the invention each of the main exhaust valve and the at least one auxiliary exhaust valve comprises a valve body, the valve body of the main exhaust valve being operatively connected with the rotary shaft via the first gear, the valve body of the at least one auxiliary exhaust valve being operatively connected with the rotary shaft via the second gear.

According to another aspect of the invention the exhaust valve assembly further comprises an exhaust valve assembly casing, the exhaust valve assembly casing having a first linear guiding for guiding the valve body of the main exhaust valve and at least one second linear guiding for guiding the valve body of the at least one auxiliary exhaust valve.<

According to a further preferred embodiment of the present invention the proposed way of connecting the main and the auxiliary exhaust valve via gears with the actuator has proven to be especially useful when applied on so called sliding valves. These sliding valve are guided along linear guides, preferably designed in the exhaust valve assembly casing. Compared to rotating exhaust valves the sliding valves can easily be moved between a retracted and an extended position. Furthermore the bearing of a linearly sliding valve is significantly easier than the bearing of a rotating exhaust valve used elsewhere in the prior art.

According to a preferred embodiment of the present invention the exhaust valve assembly casing is at least partly formed by the cylinder block.

According to another preferred embodiment of the present invention the first gear has a first number of teeth A and the second gear has a second number of teeth B and wherein B is greater than A.

It has been discovered that at a point of transition to high engine speed it is especially beneficial to open the auxiliary exhaust valves before the main exhaust valve. From the prior art it is known to provide a pneumatic actuator which retracts the auxiliary exhaust valve before the main exhaust valve. This is done by connecting the main exhaust valve to the auxiliary exhaust valve over a shoulder engaging a corresponding notch in the main exhaust valve. Since the notch provides an extended clearance the main exhaust valve is retracted only with a time delay with regard to the auxiliary exhaust valve. It has been further discovered that as a matter of fact not the chronology of the movement of the main exhaust valve with respect to the auxiliary exhaust valve positively influences the performance of the internal combustion engine but rather that the opening speed of the main exhaust port with respect to the auxiliary exhaust port is significant. According to a preferred embodiment of the present invention a different lift of the main and the auxiliary exhaust valve can be provided by using gears with different numbers of teeth. Hence in order to let the auxiliary exhaust valve open faster than the main exhaust valve, a second gear with a higher number of teeth respectively with a greater radius is used. Increasing the distance between the point of contact between the gear and the rack of the exhaust valve with respect to the axis of the rotatable shaft increases the speed of the, preferably linearly, moving exhaust valve respectively increases the distance of movement of the exhaust valve with respect to the angle of rotation of the shaft.

According to another preferred embodiment of the present invention the first gear has a first radius $R1$ and the second gear has a second radius $R2$ and wherein $R2$ is greater than $R1$.

According to a preferred embodiment of the present invention at least one of the first or the second gear is at least partly made of plastic. It has been found that using gears or gear segments made of plastic reduces the overall weight of the control valve assembly while ensuring superior reliability and low wear of the gearing on the exhaust valves.

Another aspect of the invention is directed to an internal combustion engine comprising a crankcase, a crankshaft disposed within the crankcase, a cylinder block connected to the crankcase, the cylinder block having a first and a second cylinder disposed therein. The internal combustion engine further comprising a first main exhaust port in fluid communication with the first cylinder, a second main exhaust port in fluid communication with the second cylinder, a first auxiliary exhaust port in fluid communication with the first cylinder, a second auxiliary exhaust port in fluid communication with the second cylinder and a first piston movably disposed within the first cylinder and a second piston movably disposed within the second cylinder, wherein the first and the second piston are operatively connected to the crankshaft. The internal combustion engine further comprising an exhaust valve assembly, the exhaust valve assembly comprising a first main exhaust valve for at least partially closing the first main exhaust port, a second main exhaust valve for at least partially closing the second main exhaust port, a first auxiliary exhaust valve for at least partially closing the first auxiliary exhaust port, a second auxiliary exhaust valve for at least partially closing the second auxiliary exhaust port, and an actuator for actuating the first and second main exhaust valve and the first and second auxiliary exhaust valve. Said actuator including a rotary shaft having a first and a second main gear and a first and a second auxiliary gear, wherein the rotary shaft is operatively connected to the first main exhaust valve via the first main gear and to the second main exhaust valve via the second main gear. The rotary shaft further being operatively connected to the first auxiliary exhaust valve via the first auxiliary gear and to the second auxiliary exhaust valve via the second auxiliary exhaust valve. The actuator further comprising an electric motor operatively connected to the rotary shaft for rotating the rotary shaft. Said internal combustion engine operating on a two-stroke principle.

It is a particular advantage of the gear-driven exhaust control valve assembly as herewith presented that by the use of just one single rotary shaft and the corresponding gears or gear segments disposed thereon the main and auxiliary exhaust valves of at least two cylinders can be controlled at the same time.

According to a preferred embodiment of the present invention the first main exhaust port and the first auxiliary exhaust port are disposed laterally on the first cylinder, and wherein the second main exhaust and the second auxiliary exhaust port are disposed laterally on the second cylinder.

According to another preferred embodiment of the present invention the first main exhaust valve is directly connected with the first main gear and the second main exhaust valve is directly connected with the second main gear. According to a further preferred embodiment the first auxiliary valve is directly connected with the first auxiliary gear and the second auxiliary valve is directly connected with the second auxiliary gear.

According to a preferred embodiment of the present invention at least one of the first and the second main gears and the first and the second auxiliary gears is shaped as a gear segment.

According to a preferred embodiment of the present invention each of the first and the second main exhaust valves and each of the at least first and second auxiliary exhaust valves comprises a toothed rack, wherein the toothed rack of the first main exhaust valve meshes with the teeth of the first main gear and the toothed rack of the second main exhaust valve meshes with the teeth of the second main gear and wherein the toothed rack of the at least one first auxiliary exhaust valve meshes with the teeth of the first auxiliary gear and the at least one second auxiliary exhaust valve meshes with the teeth of the gears of the second auxiliary gear.

According to a preferred embodiment of the present invention the first main exhaust valve comprises a first main valve body and the second main exhaust valve comprises a second main valve body. Furthermore according to another preferred embodiment of the invention the at least one first auxiliary exhaust valve comprises a first auxiliary valve body and the at least one second auxiliary exhaust valve comprises a second auxiliary valve body. According to these different embodiments the first main valve body being operatively connected with the rotary shaft via the first main gear, the second main valve body being operatively connected with the rotary shaft via the second main gear and the first auxiliary valve body being operatively connected with the rotary shaft via the first auxiliary gear and the second auxiliary valve body being operatively connected with the rotary shaft via the second auxiliary gear.

According to a preferred embodiment of the present invention the exhaust valve assembly further comprises an exhaust valve assembly casing, the exhaust valve assembly casing having a set of first linear guidings for guiding the first and the second main valve body and a set of second linear guidings for guiding the first and second auxiliary valve body.

According to a preferred embodiment of the present invention the exhaust valve assembly casing is at least partly formed by the first and the second cylinder.

According to a preferred embodiment of the present invention the first and the second main gear each have a first number of teeth A and the first and the second auxiliary gear each have a second number of teeth B and wherein B is greater than A.

According to a preferred embodiment of the present invention the first and the second main gear each have a first radius R1 and the first and the second auxiliary gear each have a second radius R2 and wherein R2 is greater than R1.

According to a preferred embodiment of the present invention at least one of the first or the second main or auxiliary gears is at least partly made of plastic [what type of plastic?].

It is the objective of the present invention to avoid the shortcomings outlined above and to so configure a device for controlling the exhaust period of a cylinder of a two-cycle internal combustion engine that advantageous drive conditions can be ensured, given a simple structure and a small installed size.

The present invention achieves this objective in that both the position of the main exhaust slide valve for the main exhaust outlet and the position of the auxiliary exhaust slide valve of at least the one auxiliary exhaust outlet can each be adjusted by a rack and pinion drive system, each system comprising a rack and a pinion.

By providing a main exhaust slide valve for the main exhaust outlet and a auxiliary exhaust slide valve for at least one auxiliary exhaust outlet, with the set position of the main exhaust slide valve and of the auxiliary exhaust slide valve each being adjustable by way of a rack and pinion drive system, it is possible to ensure advantageous drive conditions for the exhaust slide valves with a simple construction and a small installed size. As a result, the greatest possible peak torque in the upper speed range is achieved while, at the same time, torque is increased in the lower and middle speed ranges. By introducing a plurality of set positions for the exhaust slide valves, for example, a middle position, it is possible to improve the torque for the middle speed range even further. If the set position of the exhaust slide valves, in particular in the partial load range of the internal combustion engine, is matched continuously to the particular load on the internal combustion engine, it is possible to achieve a significant improvement of emission values, this involving a complex control system.

Particularly simple construction conditions for the adjusting drive for the exhaust slide valves will be achieved if the pinions of the main exhaust slide valve of the main exhaust outlet and of the auxiliary exhaust slide valve of a least one auxiliary exhaust outlet are mounted rigidly on a common shaft, since in this case the position of the exhaust slide valves for the main exhaust outlet and at least one auxiliary exhaust outlet can be adjusted by a common adjusting device, for example, a servo-motor.

In order to make it possible to open the auxiliary exhaust passages faster, for example, than the main exhaust passage, it is recommended that the rack and pinion drives of the main exhaust slide valve of the main exhaust outlet and the rack and pinion drive of the auxiliary exhaust slide valve of at least one auxiliary exhaust outlet be set up with different gear ratios; it has proved to be particularly advantageous if the gear ratio used for the rack and pinion drive for the main exhaust slide valve is smaller, in particular one-half, that of the gear ratio of the rack and pinion drive for at least one slide valve.

If the main exhaust slide valve and at least one auxiliary exhaust slide valve are adjusted in directions that the parallel to each other, it becomes much simpler to couple the main exhaust slide valve and at least one auxiliary exhaust slide valve. The main exhaust slide valve and the least one auxiliary exhaust slide valve can, in an advantageous manner, be actuated by the common adjusting device, for example, against the action of a spring, it being possible, in principle, to make the spring act in the direction of the operating position or the starting position.

The auxiliary exhaust slide valve for the auxiliary exhaust outlet can be guided in a bore that is parallel to the through guide for the main exhaust slide valve in the exhaust passage wall, said bore passing through the auxiliary exhaust passage, it being preferred that in this case at least one auxiliary exhaust slide valve is a shutoff slide that selectively closes or releases the auxiliary exhaust passage.

The pivoted position of the shafts is preferably adjusted by an electronic control unit as a function of the engine speed and/or the load on the engine, by way of an adjusting system, so as to permit advantageous pre-setting over a wide range. The adjusting drive comprises a servomotor that can be connected selectively through an actuating cable to the shaft so as to transmit a drive, or directly or through gearing to the shaft.

These and other aspects, advantages and features of the invention will become apparent in view of the following detailed description of the invention.

DETAILED DESCRIPTION OF THE DRAWINGS

In the drawings, which form part of this original disclosure, like elements are represented by like reference numerals.

DETAILED DESCRIPTION OF PREFERRED EMBODIMENTS

Referring to FIGS. 1 to 4, the cylinder 1 of a two-cycle internal combustion engine has an exhaust passage 3 that adjoins a main exhaust outlet 2 and, located symmetrically to this main exhaust outlet 2, lateral auxiliary exhaust outlets 4 that are connected to the exhaust passage 3 through of lateral channels 5. The wall 6 of the exhaust passage 3 that is proximate to the cylinder head forms a passage opening 7 for the main exhaust slide valve 8, which has at its unattached face end a control edge 9 that conforms to the cylinder bore. This main exhaust slide valve 8 can move between a position in which it is withdrawn into the passage opening 7 and a position in which it is advanced against the cylinder jacket, at an acute angle to the cylinder axis 10 and almost perpendicular to the wall 6 of the exhaust passage 3 that is proximate to the cylinder head.

Receiving bores for the auxiliary exhaust slide valves 11 that are associated with the lateral channels 5 and which are parallel to the passage guide 7 for the blocking slide 8 are provided in the area of the lateral channels 5; these can be moved in their associated receiving bores between a position in which the release the side channel 5 and the position in which they block the side channels 5. A rack and pinion drive that comprises a pinion 13, 14 and a rack 12 is provided to adjust the set position of the main exhaust slide valve 8 for the main exhaust outlet 2 and the set position of the auxiliary exhaust slides 11 of the auxiliary exhaust outlets 4; the pinions 13, 14 of the main exhaust slide valve 8 for the main exhaust outlet 2 and the auxiliary exhaust slides 11 of the auxiliary exhaust outlets 4 are arranged on a common shaft 15 so as to rotate in unison with said shaft 15. The gear ratios of the rack and pinion gearing for the main exhaust slide valve 8 of the main exhaust outlet 2 and the auxiliary exhaust slides 11 of the auxiliary exhaust outlets 4 are different, with the diameter of the pinion 14 being approximately half that of the pinion 13.

The rotated position of the shaft is preferably adjustable by way of an electronic control unit as a function of engine speed and of the load on the engine, this adjustment be made by way of an electric motor, so that the adjusted or set position of the slide 8, 11 can be pre-set over a wide range. However, a motor could also be mounted at a location on the engine that provides sufficient space and connected to the shaft through a Bowden cable so as to transmit a driving force.

Figure 1:
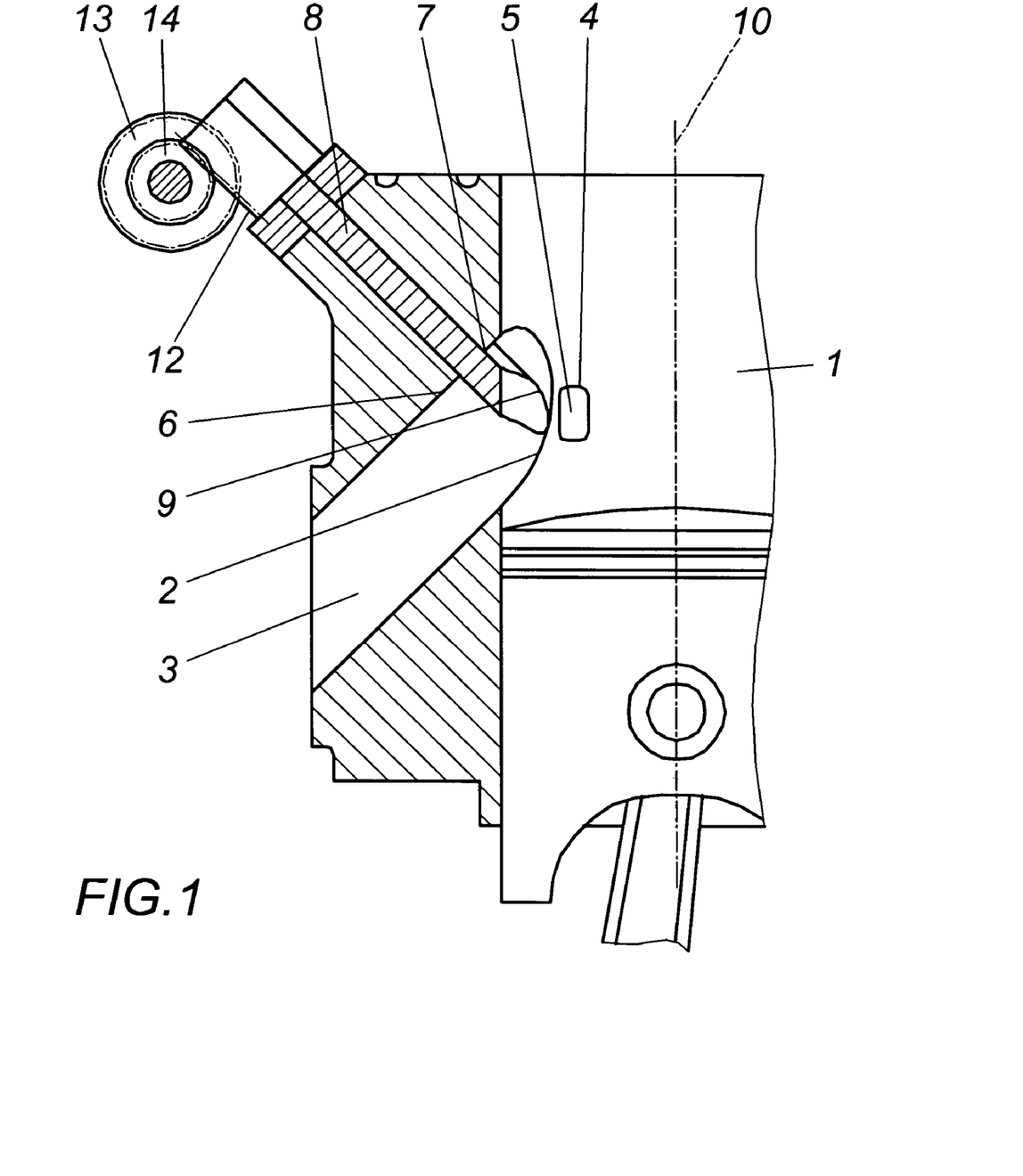
FIG. 1: A device according to the present invention for controlling the exhaust period of one cylinder of a two-cycle internal combustion engine, in axial cross-section through the cylinder in the area of the main exhaust passage.
Figure 2:
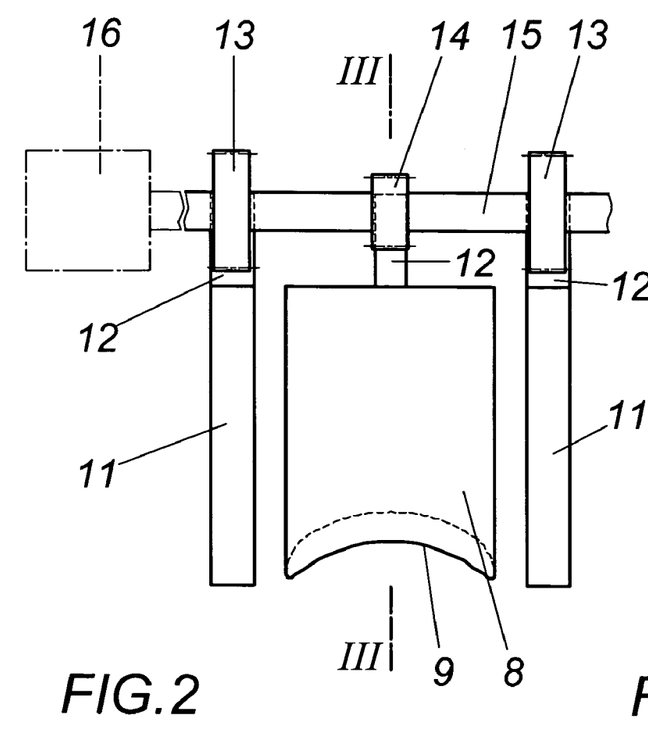
FIG. 2: the slide valves of the device according to the present invention, together with the adjusting drive as viewed from the front.
Figure 3:
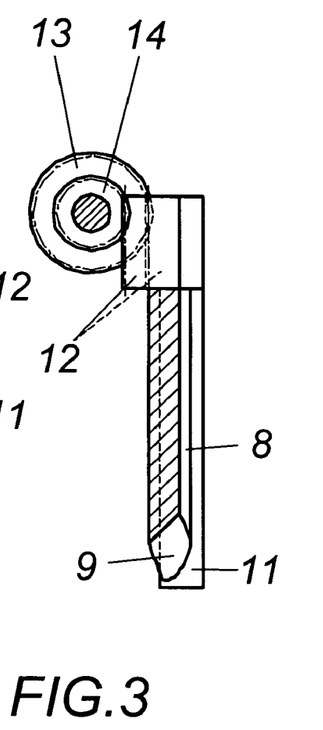
FIG. 3: the slide valves, together with the adjusting drive, in a cross section on the line III-III shown in FIG. 2.
Figure 4:
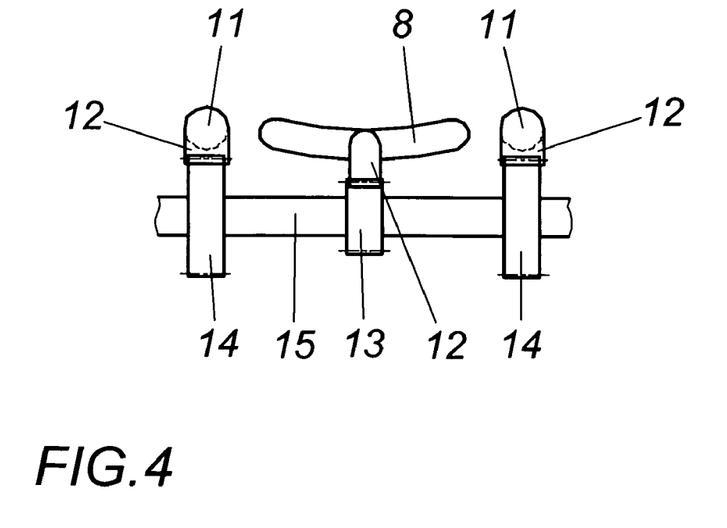
FIG. 4: the slide together with the adjusting drives as shown in FIG. 2 and FIG. 3, in plan view.
Figure 5:
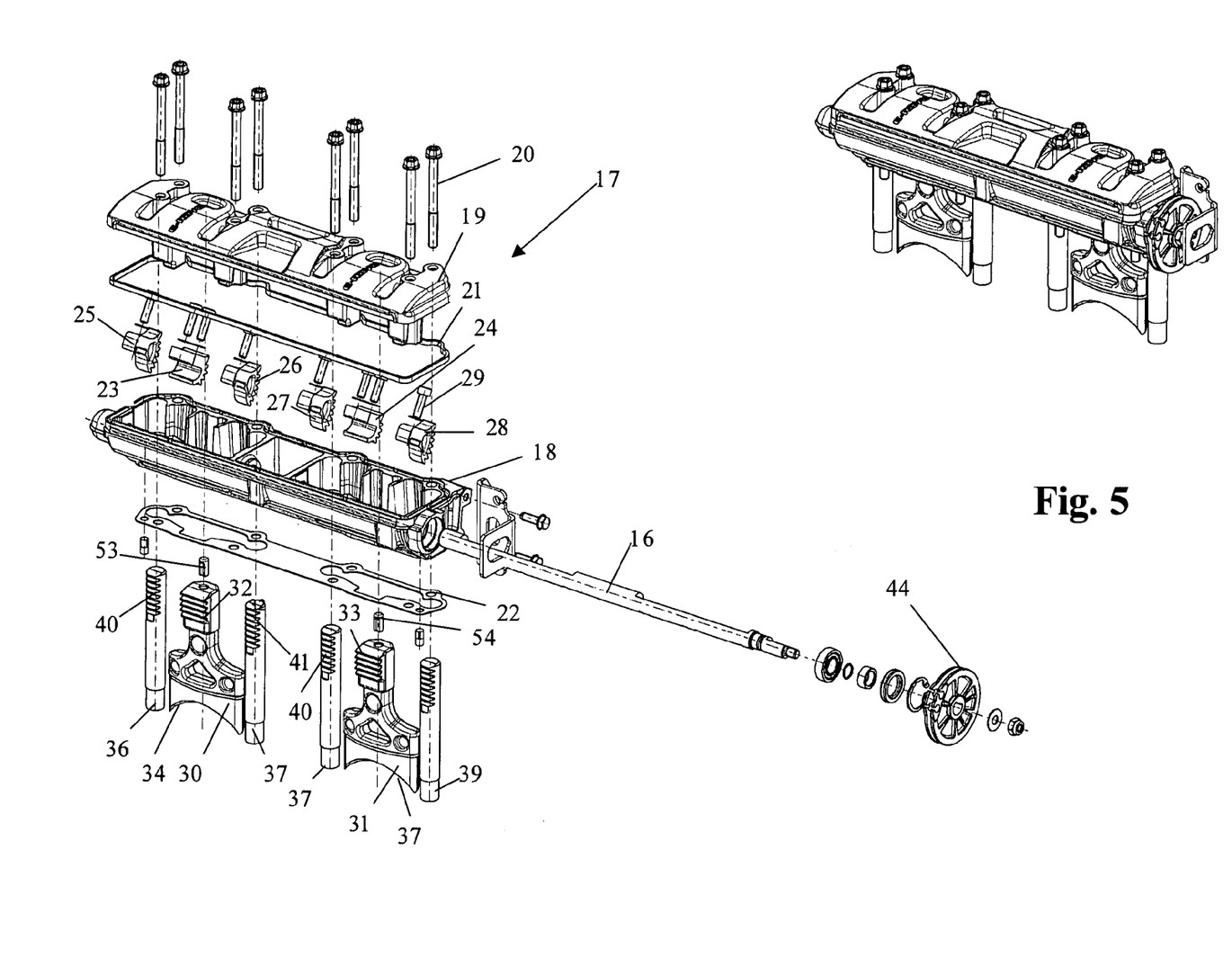
FIG. 5: an exploded view of another preferred embodiment of the invention.
Figure 6:
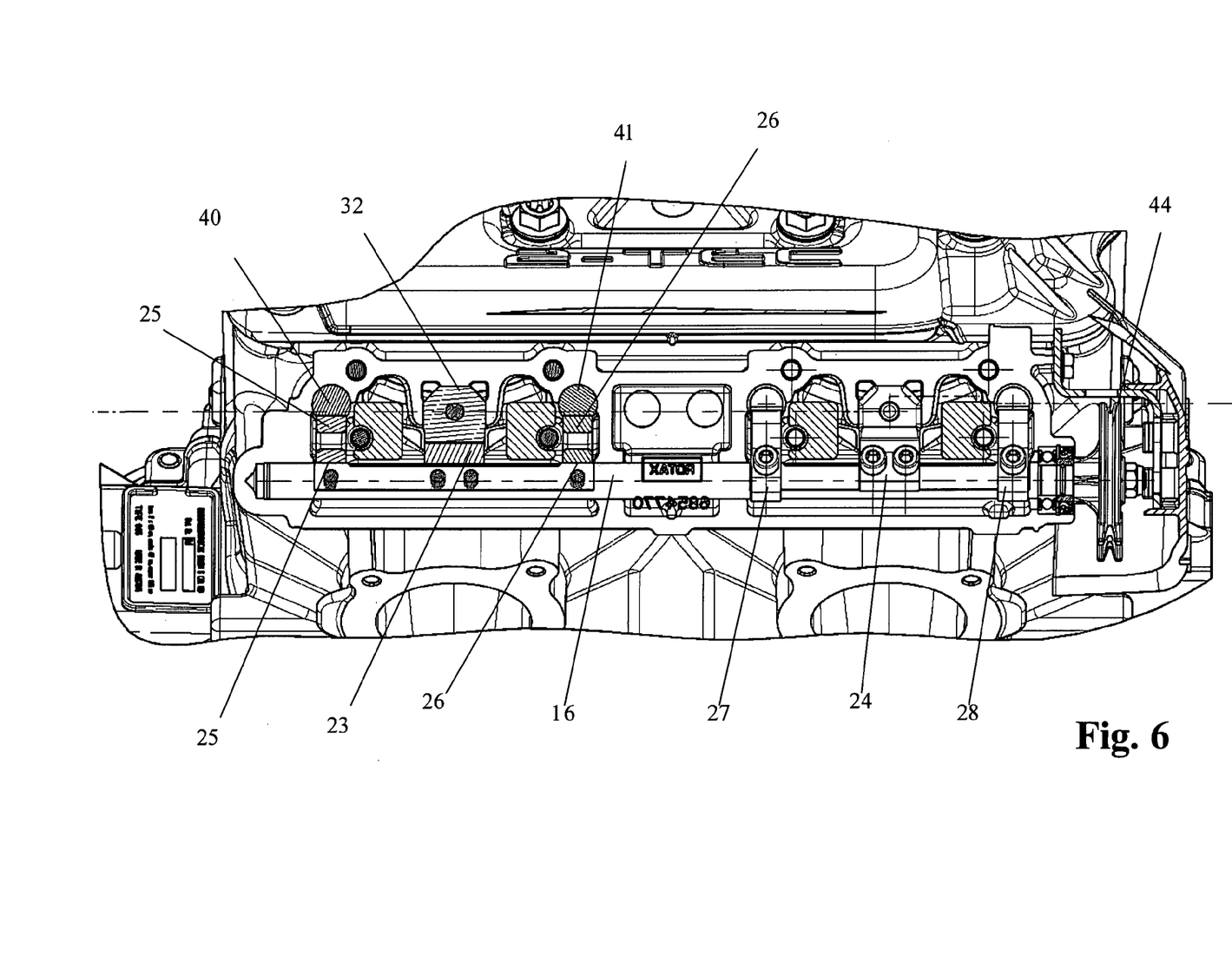
FIG. 6: a cross-section of the assembly at the connecting surface between the upper and lower casing.
Figure 7:
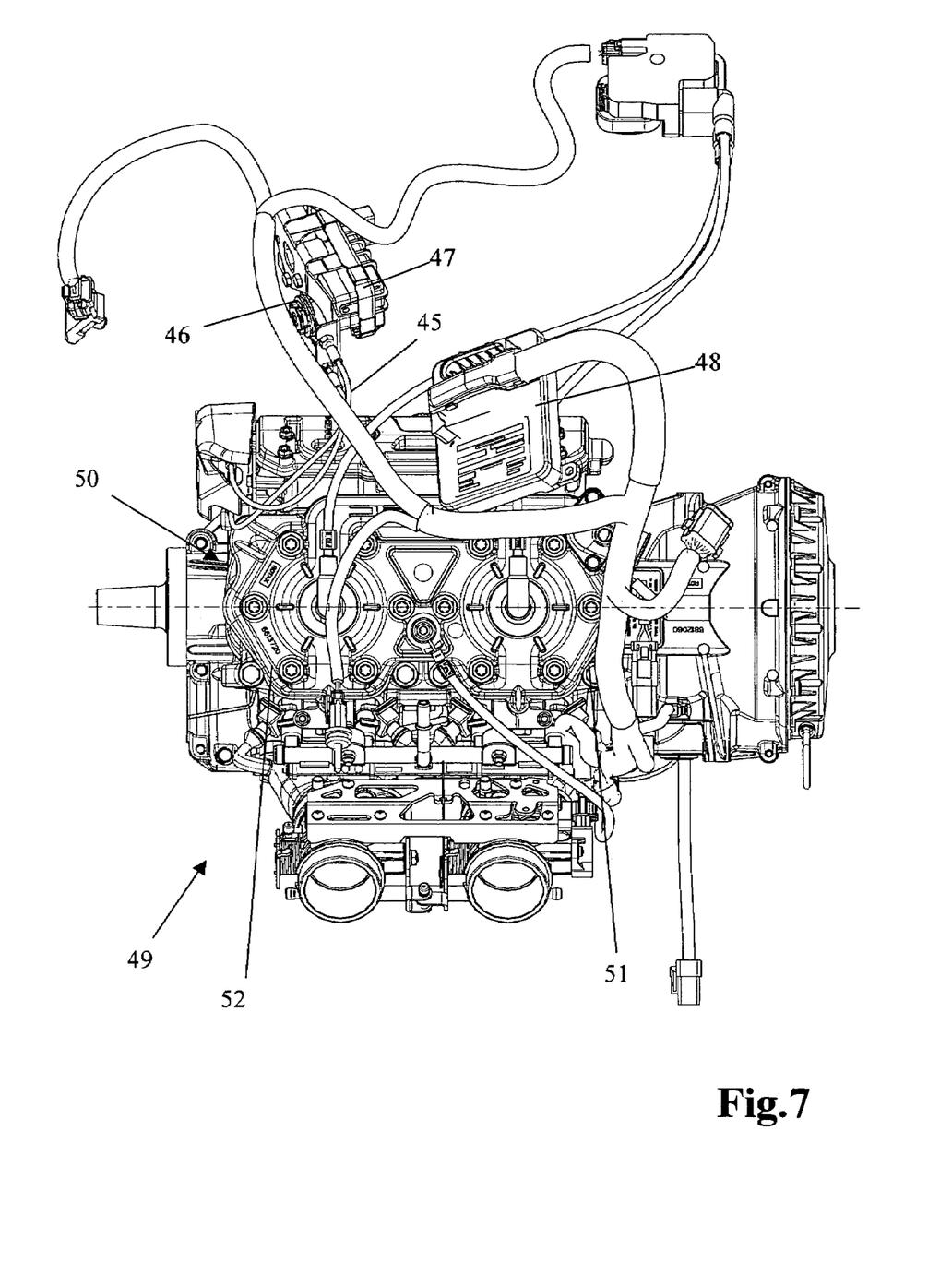
FIG. 7: a top view of a 2-stroke internal combustion engine using the inventive exhaust valve assembly.

FIG. 5 to FIG. 7 show another particular embodiment of the present invention. In this preferred embodiment shaft 16 is mounted in a exhaust valve assembly casing 17, which comprises a bottom casing 18 and a top casing 19. The bottom and the top casing are connected via screws 20, whereby the screws 20 are further used for mounting the exhaust valve assembly casing 17 on the cylinderblock of the internal combustion engine 49. According to a preferred embodiment a first gasket 21 can be disposed between the bottom casing and the top casing and a second gasket 22 between the bottom casing and the cylinders 50 of the internal combustion engine 49 for ensuring optimal tightness of the assembly. The shaft 16 carries a first and a second main gear 23 and 24 as well as four auxiliary gears 25, 26, 27 and 28. Auxiliary gears 25 and 26 as well as the first main gear 23 are assigned to the exhaust port of the first cylinder 51 of the internal combustion engine 49, while auxiliary gears 27 and 28 as well as the second main gear 24 are assigned to the second cylinder 52 of the internal combustion engine. The auxiliary gears 25, 26, 27 and 28 as well as the first and second main gear 23 and 24 are fixed on the shaft 16 by screws 29. These screws 29 ensure that the auxiliary gears and the main gears rotate in unison with the shaft 16.

The exhaust valve assembly further comprises a first main exhaust valve 30 acting on the main exhaust port of the first cylinder of the internal combustion engine and a second main exhaust valve 31 acting on the main exhaust port of the second cylinder of the internal combustion engine. As can be clearly seen in FIG. 5, the first and second main exhaust valves each comprise a toothed rack 32 and 33 as well as valve bodies with defined control edges 34 and 35. The first and second main exhaust valves are guided in the exhaust valve assembly casing 17 as well as in the cylinder via linear guides. The toothed racks 32 and 33 mesh with the first and the second main gears 23 and 24 such that a rotation of the shaft 16 will result in a linear movement of the first and the second main exhaust valve 30 and 31. As can be clearly seen in FIG. 5, there is a hole provided on each of the toothed racks 32 and 33 of the main exhaust valves. A first insert 53 is placed in the first main exhaust valve, whereas a second insert 54 is placed in the second main exhaust valve. Both inserts protrude from the holes such that the prevent contact of the top casing 19 and the toothed racks 32 and 33 when the main exhaust valve is in the fully retracted state. According to a preferred embodiment of the present invention the main gears are made of plastic, preferably of polyamide or one of its derivatives.

The exhaust valve assembly further comprises auxiliary exhaust valves 36 and 37 acting on the auxiliary exhaust ports of the first cylinder of the internal combustion engine and auxiliary exhaust valve 38 and 39 acting on the auxiliary exhaust ports of the second cylinder of the internal combustion engine. As can be clearly seen in FIG. 5, each of the auxiliary exhaust valves 36, 37, 38 and 39 comprises a toothed rack 40, 41,42 and 43. The auxiliary exhaust valves are guided in the exhaust valve assembly casing 16 as well as in the cylinder via generally linear guides. The toothed racks 40, 41, 42 and 43 of the auxiliary exhaust valves mesh with the auxiliary gears 25, 26, 27 and 28 such that a rotation of the shaft 16 will result in a linear movement of the auxiliary exhaust valves 36, 37, 38 and 39. According to a preferred embodiment of the present invention the auxiliary gears are made of plastic, preferably of a thermoplastic elastomer for instance based on co-polyester.

According to a preferred embodiment of the present invention the shaft 16 is connected with a pulley wheel 44 to rotate in unison with it. A Bowden cable 45 is used to connect the pulley 44 with a second pulley 46, as can be seen on FIG. 7. The second pulley 46 is operatively connected to an electric motor 47, preferably a servo-motor, which is controlled by an ECU 48 according to the current status of the internal combustion engine 49.

The adjusting mechanism of the exhaust valves according to the present invention offers clear advantages as compared to the prior art, which provides for resetting the slide valves by way of a spring mechanism. Thus, on the one hand, in this way any possible and undesirable movement of spring-loaded slides and thus the generation of undesirable noise can be prevented and, on the other hand, active setting of the slides into the desired intermediate positions, between an open and a closed position, can be ensured.

Figure 8:
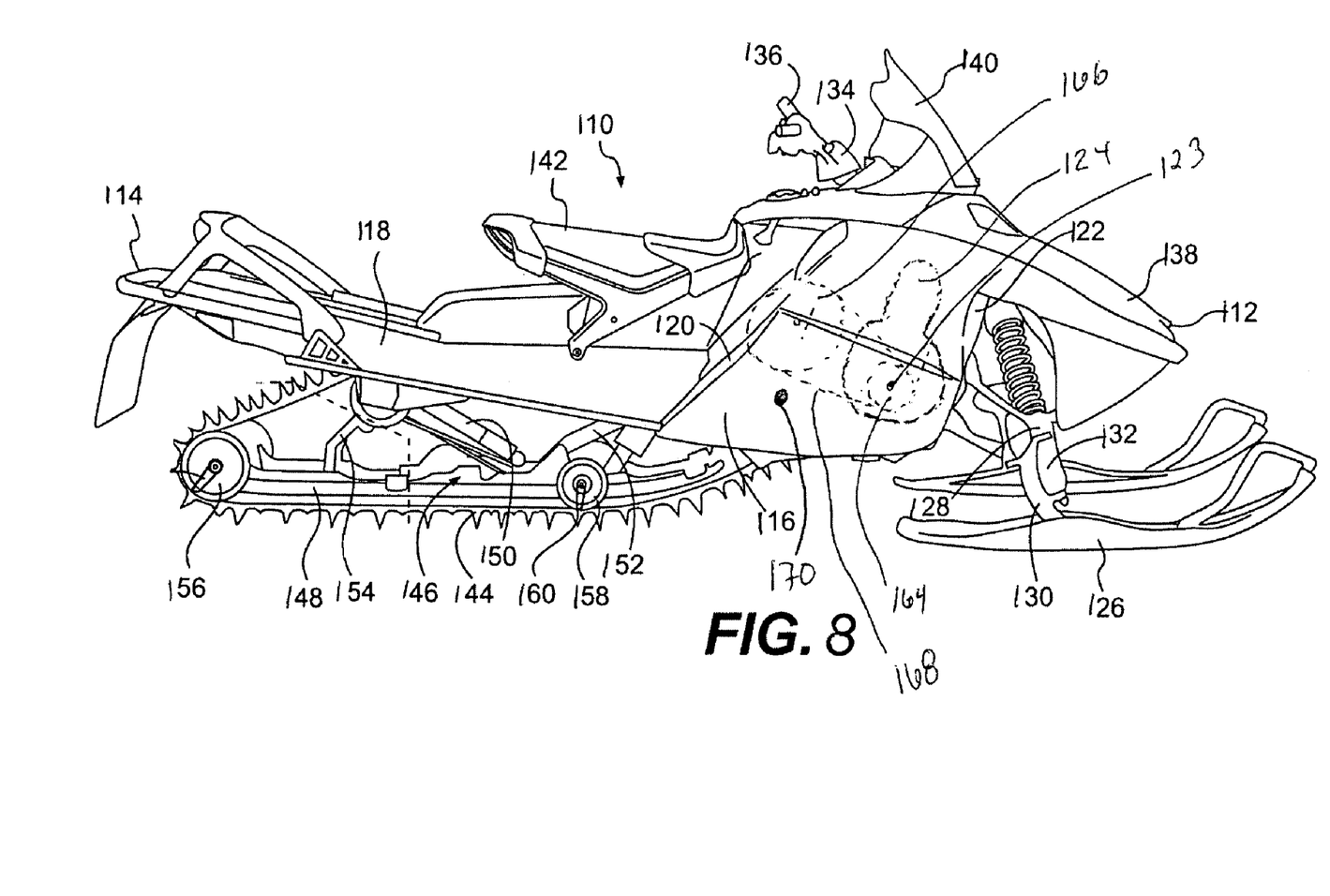
FIG. 8: a schematical drawing of a snowmobile using the 2-stroke internal combustion engine of FIG. 7

The inventive exhaust valve assembly of the present invention is suitable for use on a snowmobile 110 such as that shown in FIG. 10. FIG. 10 shows a snowmobile incorporating the present invention and is identified generally by the reference numeral 110. The snowmobile 110 includes a forward end 112 and a rearward end 114, which are defined consistently with the travel direction of the vehicle. The snowmobile 110 further includes a chassis 116 which normally includes a rear tunnel 118, an engine cradle portion 120 and a front suspension assembly portion 122. An 2-stroke internal combustion engine 124 which is schematically illustrated by broken lines is mounted to the engine cradle portion 120 of the chassis 116. A ski and steering assembly (not indicated) is provided, in which two skis 126 are positioned at the front end 112 of the snowmobile 110, and are attached to the front suspension assembly portion 122 of the chassis 116 through a front suspension assembly 128. The front suspension assembly 128 includes ski legs 130, supporting arms 132 and ball joints (not shown) for operatively joining the respective ski legs 130, supporting arms 132 and a steering column 134. The steering column 134 at its upper end is attached to a steering device such as handlebars 136 which is positioned forward of a driver (not shown) and behind the engine 124 to rotate the ski legs 130 and thus the skis 126, in order to steer the vehicle.

At the front end 112 of the snowmobile 110 there are provided fairings 138 that not only protect the engine 124, but can also be decorated to make the snowmobile 110 more aesthetically pleasing. A windshield 140 may be connected to the fairings 138 near the front end 112 of the snowmobile 110 or may be attached directly to the handlebars 136. The windshield 140 acts as a wind screen to lessen the force of air on the driver while the snowmobile 110 is traveling. A seat 142 is provided on the rear tunnel 118 to position the driver and any rider of the vehicle.

An endless drive track 144 is positioned at the rear end 114 of the snowmobile 110, and is disposed under rear tunnel 118, being operatively connected to the engine 124 via CVT 162. CVT 162 includes a drive pulley 164 rotating with an output shaft 123 of the engine 124, a driven pulley 166 as well as an endless drive belt 168 connecting the drive pulley 164 with the driven pulley 166 in a manner as well known by the man skilled in the art. One skilled in the art would recognize that the driven pulley 166 could be directly connected to a front drive axle 170 or it could be connected to the front drive axle 170 via a gear reduction unit (not shown) in order to rotate the endless drive track 144.

Thus, the endless drive track 144 is driven to run about a rear suspension assembly 146 for propulsion of the snowmobile 110. The rear suspension assembly 146 includes a pair of slide rails 148 in sliding contact with the endless drive track 144. The rear suspension assembly 146 also includes one or more shock absorbers 150 which may further include a coil spring (not shown) surrounding the individual shock absorbers 150. Front and rear suspension arms 152, 154 are provided to attach the slide rails 148 to the chassis 116. One or more idler wheels which include a pair of rear idler wheels 156 and a pair of other idler wheels 158, are also provided in the rear suspension assembly 146.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An internal combustion engine comprising:
a crankcase;
a crankshaft disposed within the crankcase;

a cylinder block connected to the crankcase, the cylinder block having a cylinder disposed therein;
a main exhaust port in fluid communication with the cylinder;
an auxiliary exhaust port in fluid communication with the cylinder;
a piston movably disposed within the cylinder and being operatively connected to the crankshaft;
an exhaust valve assembly, the exhaust valve assembly comprising:
  a main exhaust valve for at least partially closing the main exhaust port;
  an auxiliary exhaust valve for at least partially closing the auxiliary exhaust port;
  an actuator for actuating the main exhaust valve and the auxiliary exhaust valve, the actuator including:
    a rotary shaft having a first gear and a second gear, the rotary shaft being operatively connected to the main exhaust valve via the first gear, the rotary shaft being operatively connected to the auxiliary exhaust valve via the second gear, the first gear having a first radius R1, and the second gear having a second radius R2, R2 being greater than R1;
    an electric motor operatively connected to the rotary shaft for rotating the rotary shaft; and
the engine operating on a two-stroke principle.

2. The internal combustion engine of claim 1, wherein the main exhaust port and the auxiliary exhaust port are disposed laterally on the cylinder.

3. The internal combustion engine of claim 1, wherein the main exhaust valve is directly connected with the first gear and wherein the auxiliary valve is directly connected with the second gear.

4. The internal combustion engine of claim 1, wherein each of the first gear and the second gear are shaped as gear segments.

5. The internal combustion engine of claim 1, wherein the main exhaust valve and the auxiliary exhaust valve each comprise a toothed rack and wherein the toothed rack of the main exhaust valve meshes with teeth of the first gear and wherein the toothed rack of the auxiliary exhaust valve meshes with teeth of the second gear.

6. The internal combustion engine of claim 1, wherein each of the main exhaust valve and the auxiliary exhaust valve comprises a valve body, the valve body of the main exhaust valve being operatively connected with the rotary shaft via the first gear, the valve body of the auxiliary exhaust valve being operatively connected with the rotary shaft via the second gear.

7. The internal combustion engine of claim 6, wherein the exhaust valve assembly further comprises an exhaust valve assembly casing, the exhaust valve assembly casing having a first linear guide for guiding the valve body of the main exhaust valve and a second linear guide for guiding the valve body of the auxiliary exhaust valve.

8. The internal combustion engine of claim 7, wherein the exhaust valve assembly casing is at least partially formed by the one cylinder.

9. The internal combustion engine of claim 1, wherein the first gear has a first number of teeth A and the wherein the second gear has a second number of teeth B and wherein B is greater than A.

10. The internal combustion engine of claim 1, wherein at least one of the first and the second gears is at least partially made of plastic.

11. An internal combustion engine comprising:
a crankcase;
a crankshaft disposed within the crankcase;
a cylinder block connected to the crankcase, the cylinder block having a first and a second cylinder disposed therein;
a first main exhaust port in fluid communication with the first cylinder;
a second main exhaust port in fluid communication with the second cylinder;
a first auxiliary exhaust port in fluid communication with the first cylinder;
a second auxiliary exhaust port in fluid communication with the second cylinder;
a first piston movably disposed within the first cylinder and a second piston movably disposed within the second cylinder, the first and the second piston being operatively connected to the crankshaft;
an exhaust valve assembly, the exhaust valve assembly comprising:
  a first main exhaust valve for at least partially closing the first main exhaust port;
  a second main exhaust valve for at least partially closing the second main exhaust port;
  a first auxiliary exhaust valve for at least partially closing the first auxiliary exhaust port;
  a second auxiliary exhaust valve for at least partially closing the second auxiliary exhaust port;
  an actuator for actuating the first and second main exhaust valve and the first and second auxiliary exhaust valve, the actuator including:
    a rotary shaft having a first and a second main gear and a first and a second auxiliary gear, the rotary shaft being operatively connected to the first main exhaust valve via the first main gear and to the second main exhaust valve via the second main gear, the rotary shaft being operatively connected to the first auxiliary exhaust valve via the first auxiliary gear and to the second auxiliary exhaust valve via the second auxiliary exhaust valve, the first and the second main gears each having a first radius R1, and the first and the second auxiliary gears each having a second radius R2, R2 being greater than R1;
    an electric motor operatively connected to the rotary shaft for rotating the rotary shaft; and
the engine operating on a two-stroke principle.

12. The internal combustion engine of claim 11, wherein the first main exhaust port and the first auxiliary exhaust port are disposed laterally on the first cylinder, and wherein the second main exhaust and the second auxiliary exhaust port are disposed laterally on the second cylinder.

13. The internal combustion engine of claim 11, wherein:
the first main exhaust valve is directly connected with the first main gear;
the second main exhaust valve is directly connected with the second main gear;
the first auxiliary valve is directly connected with the first auxiliary gear; and
the second auxiliary valve is directly connected with the second auxiliary gear.

14. The internal combustion engine of claim 11, wherein at least one of the first main gear, the second main gear, the first auxiliary gear, and the second auxiliary gear is shaped as a gear segment.

15. The internal combustion engine of claim 11, wherein each of the first and the second main exhaust valves and each of the first and second auxiliary exhaust valves comprises a toothed rack and wherein the toothed rack of the first main exhaust valve meshes with teeth of the first main gear and the toothed rack of the second main exhaust valve meshes with teeth of the second main gear and wherein the toothed rack of the first auxiliary exhaust valve meshes with teeth of the first auxiliary gear and the second auxiliary exhaust valve meshes with teeth of the gears of the second auxiliary gear.

16. The internal combustion engine of claim 11, wherein the first main exhaust valve comprises a first main valve body and wherein the second main exhaust valve comprises a second main valve body and wherein the first auxiliary exhaust valve comprises a first auxiliary valve body and wherein the second auxiliary exhaust valve comprises a second auxiliary valve body; the first main valve body being operatively connected with the rotary shaft via the first main gear, the second main valve body being operatively connected with the rotary shaft via the second main gear and the first auxiliary valve body being operatively connected with the rotary shaft via the first auxiliary gear and the second auxiliary valve body being operatively connected with the rotary shaft via the second auxiliary gear.

17. The internal combustion engine of claim 16, wherein the exhaust valve assembly further comprises an exhaust valve assembly casing, the exhaust valve assembly casing having a set of first linear guides for guiding the first and the second main valve body and a set of second linear guides for guiding the first and second auxiliary valve body.

18. The internal combustion engine of claim 17, wherein the exhaust valve assembly casing is at least partly formed by the cylinder block.

19. The internal combustion engine of claim 11, wherein the first and the second main gears each have a first number of teeth A and the first and the second auxiliary gears each have a second number of teeth B and wherein B is greater than A.

20. The internal combustion engine of claim 11, wherein at least one of the gears is at least partially made of plastic.

21. A snowmobile, comprising:
a frame including a tunnel;
an internal combustion engine as recited in claim 1 disposed on the frame;
a drive track disposed below the tunnel and operatively connected to the engine for propelling the snowmobile;
a seat disposed on the tunnel rearward of the engine and above the drive track;
two skis disposed on the frame; and
a steering device disposed on the frame forward of the seat and operatively connected to the two skis for steering the snowmobile.

22. A snowmobile, comprising:
a frame including a tunnel;
an internal combustion engine as recited in claim 11 disposed on the frame;
a drive track disposed below the tunnel and operatively connected to the engine for propelling the snowmobile;
a seat disposed on the tunnel rearward of the engine and above the drive track;
two skis disposed on the frame; and
a steering device disposed on the frame forward of the seat and operatively connected to the two skis for steering the snowmobile.

* * * * *